(12) United States Patent
Park

(10) Patent No.: US 9,112,207 B2
(45) Date of Patent: Aug. 18, 2015

(54) BATTERY ASSEMBLY

(71) Applicant: Samsung SDI Co., Ltd., Yongin-si, Gyeonggi-do (KR)

(72) Inventor: Seong-Joon Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 224 days.

(21) Appl. No.: 13/933,357

(22) Filed: Jul. 2, 2013

(65) Prior Publication Data

US 2014/0120391 A1 May 1, 2014

(30) Foreign Application Priority Data

Oct. 30, 2012 (KR) .................. 10-2012-0121521

(51) Int. Cl.
*H01M 2/10* (2006.01)
*H01M 10/6561* (2014.01)

(52) U.S. Cl.
CPC ........ *H01M 2/1077* (2013.01); *H01M 10/5063* (2013.01)

(58) Field of Classification Search
None
See application file for complete search history.

(56) References Cited

U.S. PATENT DOCUMENTS

| 7,976,980 | B2 | 7/2011 | Yoon et al. | |
| 2008/0280194 | A1 | 11/2008 | Okada | |
| 2009/0253026 | A1* | 10/2009 | Gaben | 429/56 |
| 2011/0097614 | A1 | 4/2011 | Kim | |
| 2012/0135288 | A1* | 5/2012 | Meintschel | 429/100 |
| 2013/0022855 | A1* | 1/2013 | Hsiao et al. | 429/120 |

FOREIGN PATENT DOCUMENTS

| JP | 2008282582 A | 11/2008 |
| JP | 2010277863 A | 12/2010 |
| KR | 1020060060814 A | 6/2006 |
| KR | 1020060084887 A | 7/2006 |
| KR | 1020110044129 A | 4/2011 |

* cited by examiner

*Primary Examiner* — Patrick Ryan
*Assistant Examiner* — Wyatt McConnell
(74) *Attorney, Agent, or Firm* — Robert E. Bushnell, Esq.

(57) ABSTRACT

A battery assembly including a frame including a pair of side plates that include a plurality of guide grooves and a bottom plate connected to the side plates; a plurality of barriers each including a pair of side panels, a lower panel, an upper panel, a plurality of protrusions that are protruded from the side panels, and a dividing panel, wherein the plurality of protrusions are inserted into the plurality of guide grooves to slidably move along the guide grooves upon being mounted on the frame, and a plurality of batteries that are respectively accommodated by the barriers, wherein the barriers are stacked such that the dividing panels of the adjacent barriers face one another.

20 Claims, 6 Drawing Sheets

BATTERY ASSEMBLY

CLAIM OF PRIORITY

This application makes reference to, incorporates the same herein, and claims all benefits accruing under 35 U.S.C. §119 from an application earlier filed in the Korean Intellectual Property Office filed on 30 Oct. 2012 and there duly assigned Serial No. 10-2012-0121521.

BACKGROUND OF THE INVENTION

1. Field of the Invention

The present invention relates to a battery assembly in which when barriers are mounted on a frame, protrusions of the barriers are guided by guide grooves of the frame so that the barriers are slidably mounted on the frame, thereby providing an easy assembly process and a battery assembly in which batteries are stably supported.

2. Description of the Related Art

Rechargeable batteries are manufactured as a single-piece battery for use in compact electronic appliances or as a battery assembly in which a plurality of batteries are connected in order to supply a large-capacity power to an electrical vehicle or mechanical equipment. In the battery assembly which is manufactured by collecting a plurality of batteries, a supporting structure for supporting the plurality of batteries is required. However, for example, in a battery assembly that is mounted in a hybrid vehicle or an electrical vehicle, a structure for coupling batteries and a supporting structure is complicated due to the increased size and number of batteries, and thus it is difficult to assemble the batteries and the supporting structure.

KR 2006-0060814 discloses a battery assembly having a structure in which a plurality of unit batteries are respectively inserted into slots arranged in a supporting structure. According to this battery assembly, a plurality of slots for respective batteries are to be installed in the supporting structure, and thus, as the number of batteries is increased, volume and weight of the supporting structure increases also. Moreover, heat generated by the batteries may not be radiated to the outside, but is transferred to the supporting structure, and this may degrade electrical performance of the battery assembly.

SUMMARY OF THE INVENTION

The present invention provides a battery assembly which has a simplified structure for supporting a plurality of batteries, and which is capable of stably supporting a plurality of large-sized batteries.

The present invention also provides a battery assembly in which positioning of batteries within a frame that supports the batteries are precisely maintained, so that variations in the relative positioning of the batteries are minimized.

The present invention also provides a battery assembly, for which ease in assembly in terms of collecting a plurality of batteries is improved, and maintenance of which is convenient.

The present invention also provides a battery assembly having excellent heat radiation performance.

According to one aspect of the present invention, there is provided a battery assembly, including a frame including a pair of side plates that face each other, each side plate having a guide groove that extends parallel to a bottom edge of the side plates, and a bottom plate connecting the bottom edges of the side plates, a plurality of barriers, each barrier including a pair of side panels facing the side plates, a lower panel that connects lower ends of the side panels and faces the bottom plate, an upper panel connecting upper ends of the side panels, a plurality of protrusions protruding from the side panels and being coupled with the guide grooves, and a dividing panel that connects the side panels between the upper panel and the lower panel, wherein the protrusions are inserted into the guide grooves to allow barriers mounted to the frame to move only in a longitudinal direction of the frame and a plurality of batteries that are respectively accommodated within the barriers and the frame, wherein the barriers are stacked such that the dividing panels of the adjacent barriers face one another.

The side plates may include a first aperture through which the air flows in and out of the frame. The bottom plates may include a second aperture through which the air flows in and out of the frame. The barriers may also include a third aperture arranged in at least one of the side panel, the upper panel, and the lower panel to allow air to flow through the third aperture to the batteries. The battery assembly may also include an aligning unit arranged along inner edges of the frame where the side plates are connected to the bottom plate, the aligning unit being in contact with the barriers to regulate positioning of the barriers with respect to the frame. The aligning unit may include a first surface contacting one of the side plates, a second surface contacting the bottom plate, and a third surface contacting the barriers. The aligning unit may include an elastic material. The battery assembly may also include a is plurality of elastic protrusions that protrudes from the bottom plate to support the lower panel of the barriers. Each of the batteries may include a pair of terminal portions that extends through grooves in the upper panel of the barriers. The dividing panel may be attached along a central longitudinal axis of each of the side plates so that each side plate of each barrier is arranged over two adjacent batteries.

The battery assembly may also include a plurality of support protrusions that protrude from the dividing panel of each of the barriers to contact the batteries. The batteries and the barriers may be alternately stacked within the frame to produce a battery stack structure having adjoining batteries on both sides of each of the dividing panels of each barrier. The battery assembly may also include an external barrier that covers one of the batteries that is exposed at one of two end portions of the battery stack structure. The battery assembly may also include an external cover that is coupled to an outer portion of the frame to cover the external barrier. The battery assembly may also include an upper cover that is coupled to an upper portion of the frame to cover the upper panels of the barriers. Each dividing panel may be attached along a edge of each of the side plates so that each side plate of each barrier is arranged to correspond to only one of the batteries.

According to one aspect of the present invention, there is provided a battery assembly that includes a frame including a pair of side plates that face each other, and a bottom plate connecting the bottom edges of the side plates, each of the side plates including a groove that extends along a length of the frame, a plurality of barriers, each barrier including a pair of side panels facing the side plates, a lower panel that connects lower ends of the side panels and facing the bottom plate, an upper panel connecting upper ends of the side panels, and a dividing panel connected to each of the side panels, the lower and the upper panel, an external side of each side panel including a protrusion that engages with a corresponding groove of the frame and a plurality of batteries that are respectively accommodated within the frame in an alternating manner with the barriers, wherein the dividing panel of each barrier is arranged between two adjacent ones of the batteries.

The protrusions and the grooves may allow the barriers together with the batteries to move only horizontally in a lengthwise direction of the frame. The battery assembly may also include an aligning unit arranged along bottom inner edges of the frame where the side plates are connected to the bottom plate, the aligning unit may be in contact with the barriers to regulate positioning of the barriers with respect to the frame. Each dividing panel may have protrusions on both sides that contact ones of the batteries to provide a space between the barriers and the batteries to allow air to circulate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, the structure and operation of a battery assembly according to embodiments of the present invention will now be described more fully with reference to the is accompanying drawings, in which exemplary embodiments of the invention are shown. As used herein, the term "and/or" includes any and all combinations of one or more of the associated listed items.

Figure 1:
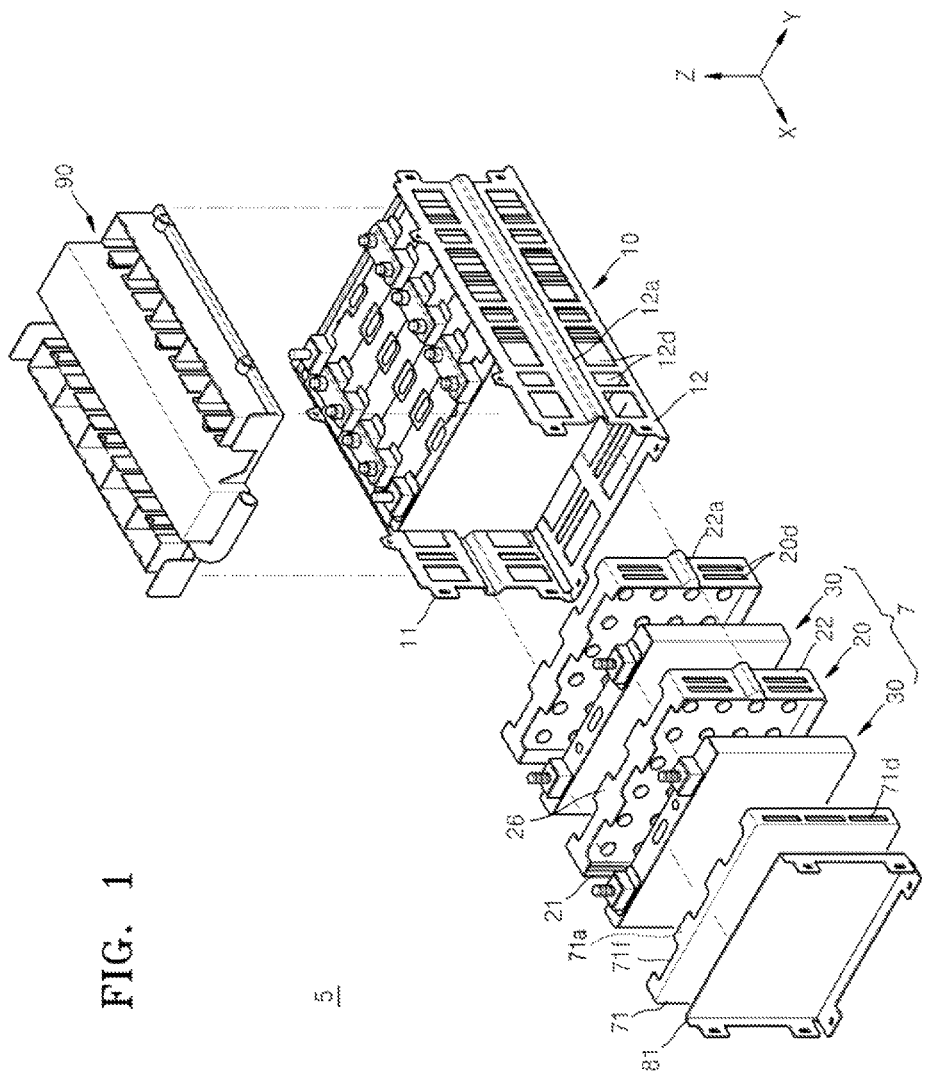
FIG. 1 is a disassembled perspective view of elements of a battery assembly according to a first embodiment of the present invention.
Figure 2:
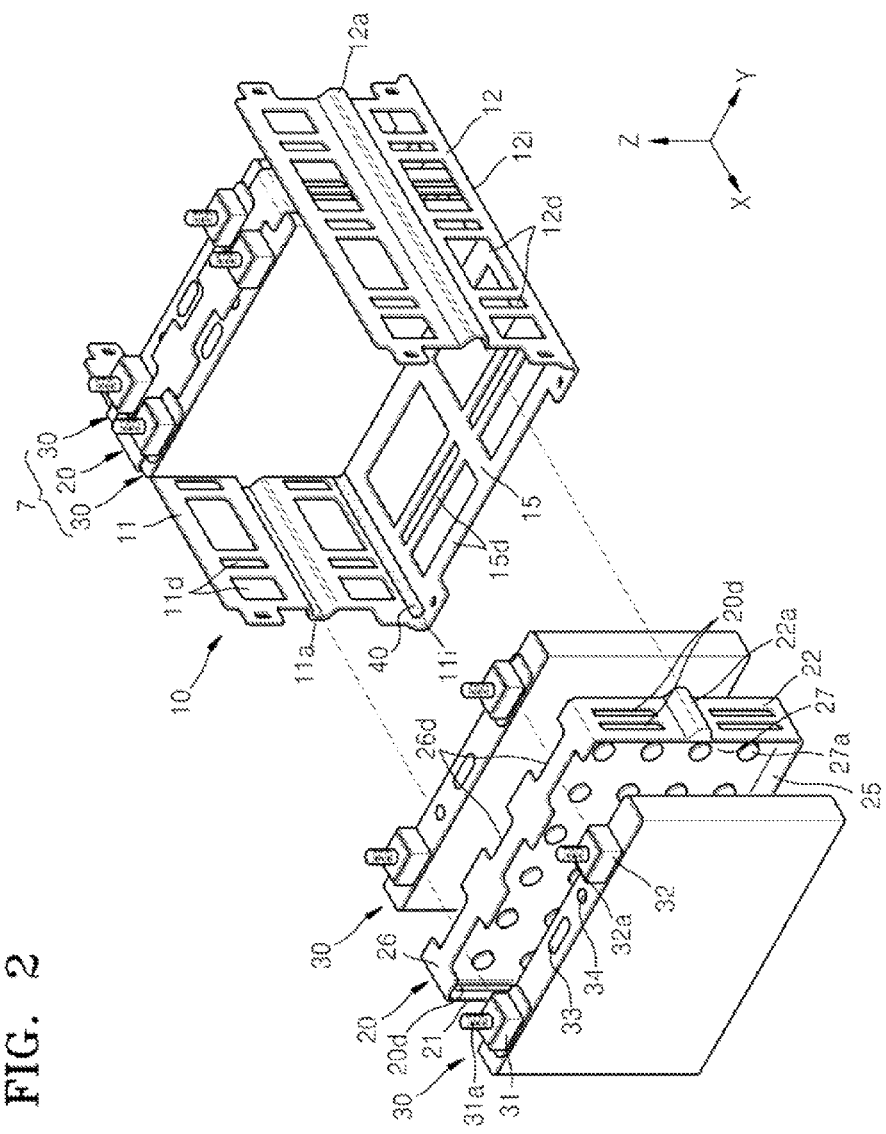
FIG. 2 is a disassembled perspective view of some of elements of the battery assembly of FIG. 1.

Turning now to FIGS. 1 and 2, FIG. 1 is a disassembled perspective view of elements of a battery assembly 5 according to a first embodiment of the present invention, and FIG. 2 is a disassembled perspective view of some elements of the battery assembly 5 of FIG. 1. The battery assembly 5 illustrated in FIGS. 1 and 2 includes a plurality of batteries 30, a plurality of barriers 20 accommodating the batteries 30, and a frame 10 in which the batteries 30 and the barriers 20 are accommodated. The battery assembly 5 may be used as an energy source for a hybrid electrical vehicle (HEV), an electrical vehicle (EV) or motor driven machines, such as a wireless cleaner, an electromotive bicycle, or an electrical scooter, or power generating facilities.

The frame 10 accommodates and stably supports the barriers 20 and the batteries 30. The frame 10 may be manufactured by cutting and bending a metal plate material such as aluminum, or may instead be made out of plastic. The frame 10 includes a pair of side plates 11 and 12 that are disposed to face each other, and a bottom plate 15 connected to first and second edges 11i and 12i (or bottom edges) of the side plates 11 and 12. The side plates 11 and 12 respectively include guide grooves 11a and 12a that extend in a longitudinal or lengthwise direction of the frame 10 that is substantially parallel to the first and second edges 11i and 12i. As illustrated in FIG. 2, the guide grooves 11a and 12a and the first and second edges 11i and 12i both extend in an X-axis direction, and thus are parallel to each other.

The guide grooves 11a and 12a guide the barriers 20 and enable the barriers 20 to slide in the X-axis direction within the frame 10 when the barriers 20 accommodating the batteries 30 are inserted into the frame 10. The guide grooves 11a and 12a may be produced when forming the side plates 11 and 12 and the bottom plate 15, for example, by cutting and bending the frame 10.

The side plates 11 and 12 respectively include first apertures 11d and 12d through which air circulates into and out of the frame 10. Also, the bottom plate 15 includes a second aperture 15d through which air circulates into and out of the frame 10.

The barriers 20 may include a pair of side panels 21 and 22 facing the side plates 11 and 12 respectively, a lower panel 25 that connects lower ends of the side panels 21 and 22 and faces the bottom plate 15, an upper panel 26 connecting upper ends of the side panels 21 and 22, a dividing panel 27 connecting the side panels 21 and 22 between the upper panel 26 and the lower panel 25, and protrusions 21a and 22a that protrude from the side panels 21 and 22 and are coupled with the guide grooves 11a and 12a of the frame 10. The barriers 20 include a third aperture 20d through which air flows to the batteries 30, and which is arranged in at least one of the side panels 21 and 22, the upper panel 26, and the lower panel 25.

Through the first apertures 11d and 12d and the second aperture 15d arranged in the frame 10 and the third aperture 20d arranged in the barriers 20, the air inside the frame 10 may be discharged out of the battery assembly 5, and cool air from the outside may flow into the battery assembly 5 so as to dissipate heat from the batteries 30, thereby maintaining good circulation and thus good performance of the battery assembly 5.

When the barriers 20 as described above are mounted on the frame 10, while the two protrusions 21a and 22a are inserted into the guide grooves 11a and 12a respectively of the frame 10, the barriers 20 may slidably move in the X-axis direction inside the frame 10, that is, along an extension direction of the guide grooves 11a and 12a. When the batteries 30 and the barriers 20 are mounted within the frame 10, an upper cover 90 covering the upper panel 26 of the barriers 20 is coupled to an upper portion of the frame 10.

Figure 3:
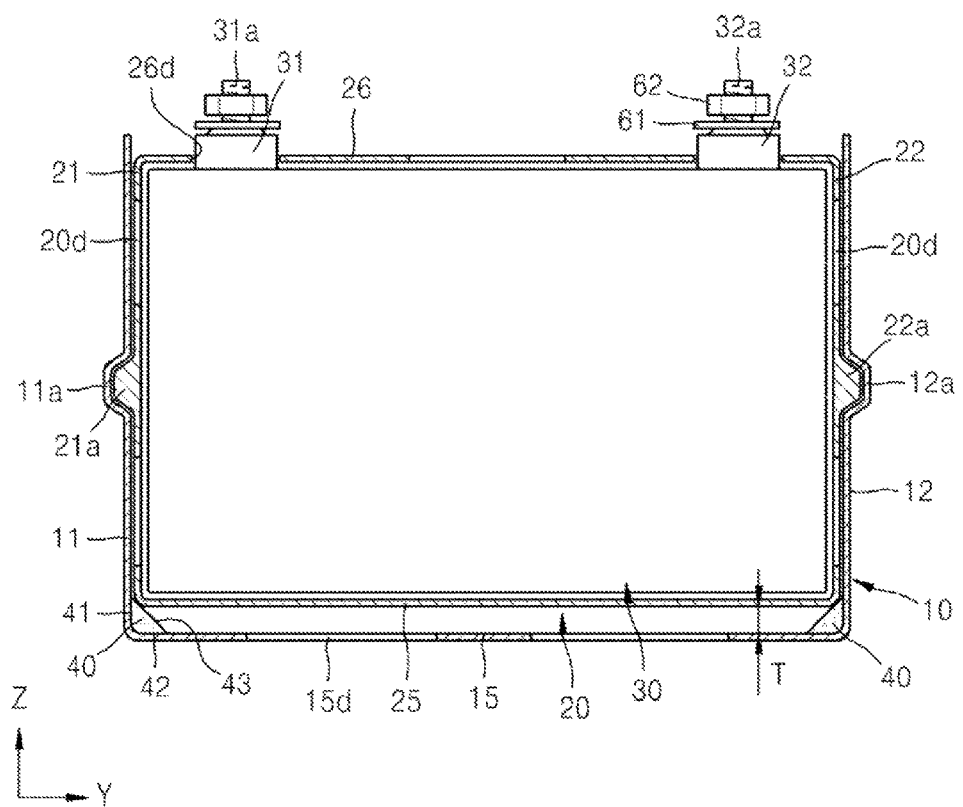
FIG. 3 is a front cross-sectional view of a portion of the battery assembly of FIG. 1.
Figure 4:
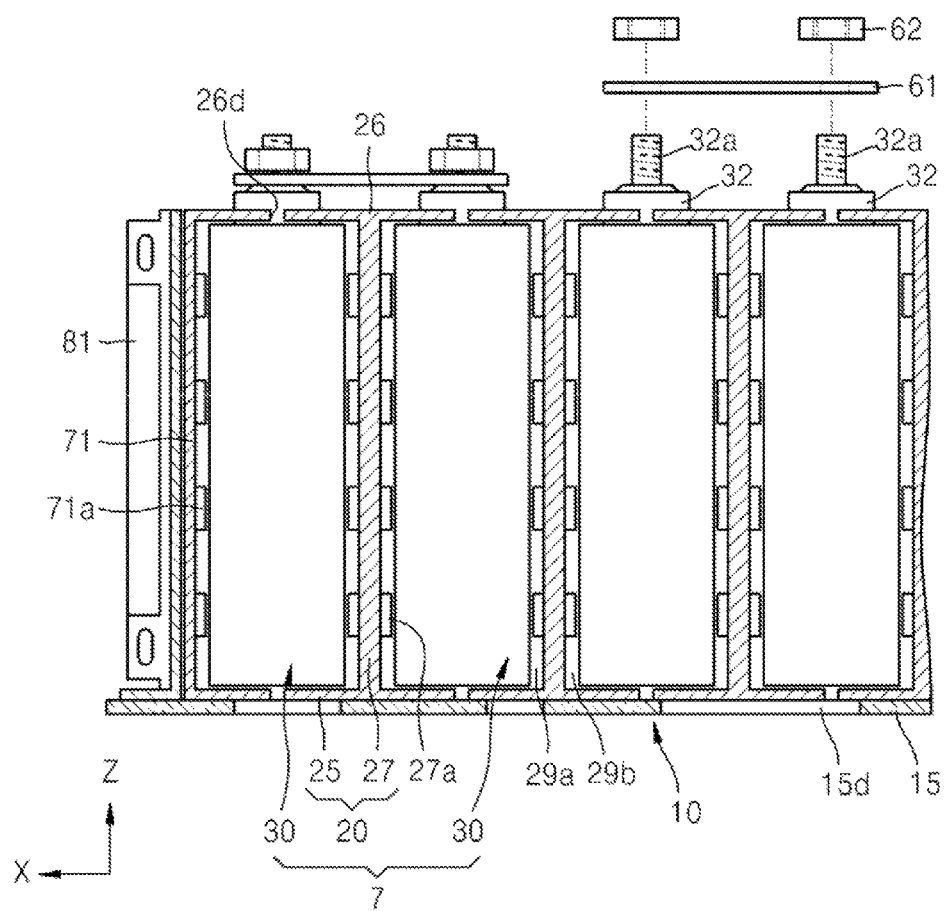
FIG. 4 is a side cross-sectional view of a portion of the battery assembly of FIG. 1.

Turning now to FIGS. 3 and 4, FIG. 3 is a front cross-sectional view of a portion of the battery assembly 5 of FIG. 1, and FIG. 4 is a side cross-sectional view of a portion of the battery assembly 5 of FIG. 1. In the first two embodiments of the present invention, the dividing panel 27 of each of the barriers 20 connects a longitudinal central axis of each of the side panels 21 and 22, the lower panel 25 and the upper panel 26 so as to form accommodation is spaces 29a and 29b on both sides of the dividing panel 27 in which the adjoining batteries 30 are accommodated.

The barriers 20 may include a plurality of supporting protrusions 27a that are protruded from the dividing panel 27 toward the batteries 30 to support the batteries 30. The supporting protrusions 27a protrude from both sides of the dividing panel 27 to space-apart the batteries 30 from the dividing panel 27s of the barriers 20 by a predetermined distance to provide a path through which air for heat radiation can circulate.

Referring now to FIG. 2, a safety aperture 33 and an electrolyte injection port 34 are arranged at an upper portion of each battery 30, and a first terminal portion 31 and a second terminal portion 32 are arranged on two sides of the safety aperture 33 and the electrolyte injection port 34. A first current-collecting terminal 31a and a second current-collecting terminal 32a are respectively arranged at upper ends of the first terminal portion 31 and the second terminal portion 32. The first terminal portion 31 and the second terminal portion 32 are protruded out of the upper panel 26 through grooves 26d arranged in the upper panel 26 of the barriers 20.

The first current-collecting terminal 31a of the first terminal portion 31 and the second current-collecting terminal 32a of the second terminal portion 32 of the adjacent batteries 30 are mechanically and electrically connected via a bus bar 61. A screw surface is arranged on an outer portion of the first current-collecting terminal 31a and the second current-collecting terminal 32a. As a fixing nut 62 is coupled to each of the first current-collecting terminal 31a and the second current-collecting terminal 32a, the first current-collecting terminal 31a and the second current-collecting terminal 32a are fixed to the bus bar 61 and the fixing nut 62.

Because the plurality of barriers 20 including the batteries 30 arranged on two sides thereof are sequentially stacked inside the frame 10, the plurality of batteries 30 and the plurality of barriers 20 form a battery stack structure 7. External barriers 71 covering the batteries 30 exposed outside are installed at least one end portion of the battery stack structure 7. The external barrier 71 also includes supporting protrusions 71a that protrude toward the is batteries 30 and contact a surface of the batteries 30. Also, the external barrier 71 includes a plurality of grooves 71f through which the first terminal portion 31 and the second terminal portion 32 of the batteries 30 passed through in an upward direction (see FIG. 1), and apertures 71d to allow for air to circulate.

An external cover 81 covering the external barrier 71 is coupled to the frame 10 at both end portions of the frame 10. The external cover 81 surrounds the batteries 30 and the barriers 20 together with the frame 10 to support and protect the batteries 30 and the barriers 20. While only the external cover 81 and the external barrier 71 arranged at one side as illustrated in FIGS. 1 and 4, the external cover 81 and the external barrier 71 having the same configuration may also be disposed at the opposite side of the frame 10.

Battery assembly 5 according to the first embodiment also includes an aligning unit 40 arranged along an inner edge at the bottom of the frame 10 where the side plates 11 and 12 are joined to the bottom plate 15. The aligning unit 40 contacts the barriers 20 to regulate positioning of the barriers 20 with respect to the frame 10. Via the aligning unit 40, the barriers 20 are maintained at a predetermined distance T from the bottom plate 15 of frame 10.

The aligning unit 40 may have a triangular shape having a first surface 41 contacting one of the side plates 11 and 12, a second surface 42 contacting the bottom plate 15, and a third surface 43 contacting the barriers 20. The aligning unit 40 may include an elastic material. For example, the aligning unit 40 may be made out of a rubber or a synthetic resin having elasticity.

According to the battery assembly 5 having the above-described configuration, as the protrusions 21a and 22a of the barriers 20 slidably move along the guide grooves 11a and 12a of the frame 10 when the barriers 20 are mounted within the frame 10, an operation of installing the barriers 20 and the batteries 30 into the frame 10 may be performed easily. In addition, the guide grooves 11a and 12a support the protrusions 21a and 22a so that they slidably move horizontally along a length of the frame 10, while restricting vertical movement of the protrusions 21a and 22a, and thus vertical movement of the barriers 20 with respect to is the frame 10 is thereby restricted. Accordingly, the first terminal unit 31 and the second terminal unit 32 may be at a uniform height, and thus, a connecting operation of the batteries 30 may be easy, and an electrically connected state of the batteries 30 may be stably maintained. In addition, because the aligning unit 40 is included, positioning of the barriers 20 with respect to the frame 10 may be precisely controlled, and thus mechanical and electrical connection structures of the battery assembly 5 may be further stabilized.

In particular, also when external impact is applied to the battery assembly 5, due to the function of the guide grooves 11a and 12a and the aligning unit 40 of the frame 10, relative positioning of the barriers 20 and the batteries 30 with respect to the frame 10 may be firmly maintained, and thus problems such as damage to a connecting portion between the first terminal portion 31 and the second terminal portion 32 of the adjacent batteries 30 may be minimized.

Figure 5:
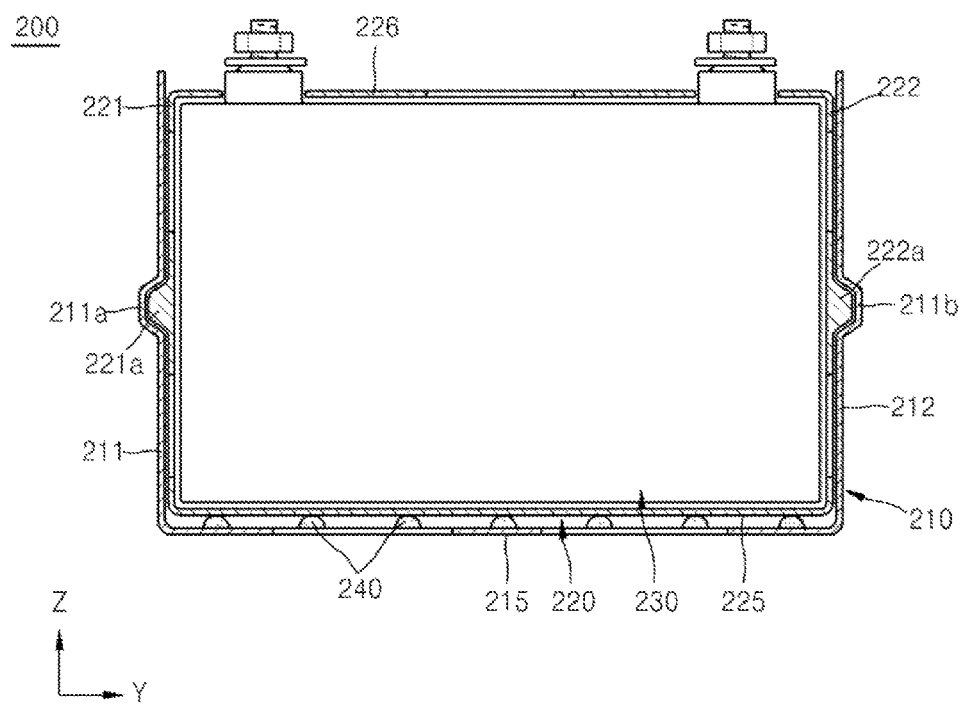
FIG. 5 is a front cross-sectional view of a portion of a battery assembly according to a second embodiment of the present invention.

Turning now to FIG. 5, FIG. 5 is a front cross-sectional view of a portion of a battery assembly 200 according to a second embodiment of the present invention. The battery assembly 200 illustrated in FIG. 5 is similar to the battery assembly 100 illustrated in FIGS. 1 through 4, except that a plurality of elastic protrusions 240 are included instead of the aligning unit 40. The battery assembly 200 of FIG. 5 includes a plurality of batteries 230, a plurality of barriers 220 accommodating the batteries 230, and a frame 210 in which the batteries 230 and the barriers 220 are accommodated.

The frame 210 includes a pair of side plates 211 and 212 disposed to face each other and a bottom plate 215 connecting the side plates 211 and 212. The side plates 211 and 212 respectively include a plurality of guide grooves 211a and 212a which extend approximately parallel to a length of the bottom plate 215.

The barriers 220 include: a pair of side panels 221 and 222 facing the side plates 211 and 212, a lower panel 225 connecting lower ends of the side panels 221 and 222 and facing the bottom plate 215, a upper panel 226 connecting upper ends of the side panels 221 and 222, a dividing panel (not shown) connecting the side panels 221 and 222 between the upper panel 226 and the lower panel 225, and a plurality of protrusions 221a and 222a that protrude from the side panels 221 and 222 and are coupled to the guide grooves 211a and 212a of the frame 210.

The elastic protrusions 240 protrude from the bottom plate 215 of the frame 210 and support the lower panel 225 of the barriers 220. The elastic protrusions 240 contact the barriers 220 to regulate positioning of the barriers 220 with respect to the frame 210. The elastic protrusions 240 may be integrally formed with the frame 210 on a surface of the frame 210, and may be made out of the same material as the frame 210. For example, the elastic protrusion 240 may be formed by curving a metal plate when manufacturing the frame 210. Alternatively, the elastic protrusion 240 may be made out of rubber or synthetic resin having elasticity, and be attached on a surface of the bottom plate 215. Because positioning of the barriers 220 with respect to the frame 210 may be precisely controlled and regulated by including the elastic protrusions 240, mechanical and electrical connection structures of the battery assembly 200 may be further stabilized.

Figure 6:
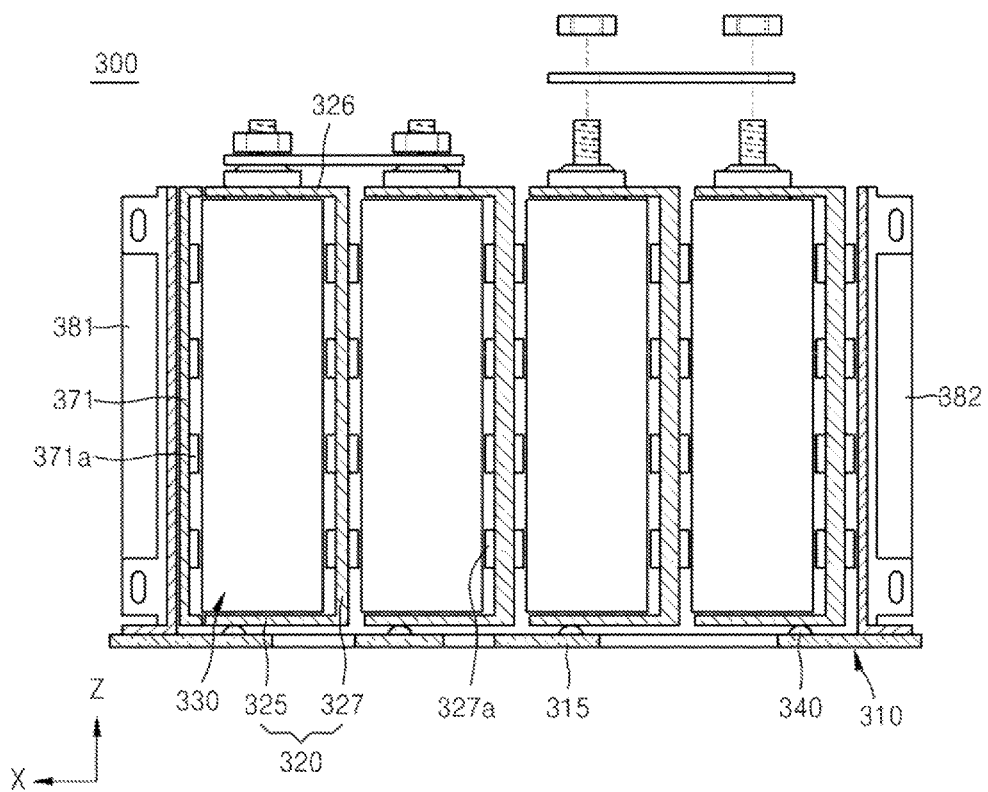
FIG. 6 is a side cross-sectional view of a portion of a battery assembly according to a third embodiment of the present invention.

Turning now to FIG. 6, FIG. 6 is a side cross-sectional view of a portion of a battery assembly 300 according to a third embodiment of the present invention. The battery assembly 300 illustrated in FIG. 6 is similar to the battery assembly 100 illustrated in FIGS. 1 through 4, except that barriers 320 are constructed differently so that dividing panel 327 is joined to an edge of the upper panel 326, lower panel 325 and side panels 321 and 322 instead of being joined to a central axis of these elements. Consequently, the upper panel 326, lower panel 325 and side panels 321 and 322 of a single barrier 320 corresponds to just a single battery 330 instead of two.

The battery assembly 300 of FIG. 6 includes a plurality of batteries 330, a plurality of barriers 320 accommodating the batteries 330, and a frame 310 in which the batteries 330 and the barriers 320 are accommodated. The barriers 320 include a dividing panel 327 connecting edge portions of an upper panel 326 and a lower panel 325. Consequently, an accommodation space in which the batteries 330 are inserted corresponds to a single barrier 320 instead of two barriers. Unlike the battery assembly 100 of FIGS. 1 through 4 or the battery assembly 200 of FIG. 5, the upper panel 326, lower panel 325 and side panels 321 and 322 of each barrier 320 corresponds to just one battery 330 instead of two.

The barriers 320 may include a plurality of supporting protrusions 327a that protrude toward the batteries 330 from the dividing panel 327 to support the batteries 330. The supporting protrusions 327a protrude from both sides of the dividing panel 327 to separate the batteries 330 from the dividing panel 327 of the barriers 320 by a predetermined distance, thereby providing a path through which air for heat radiation can pass.

As in the second embodiment of FIG. 5, the battery assembly 300 according to the third embodiment of FIG. 6 also includes a plurality of elastic protrusions 340 arranged on the bottom plate 315 to support the lower panel 325 of the barriers 320. The elastic protrusions 340 contacts the barriers 320 so as to regulate positioning of the barriers 320 with respect to the frame 310.

An external barrier 371 covering the batteries 330 is installed on a left end portion of the frame 310. The external barrier 371 also includes a plurality of supporting protrusions 371a that protrude toward the batteries 330 and contact a surface of the batteries 330.

An external cover 381 covering the external barrier 371 is coupled to the frame 310 at both left and right sides of the frame 310. The external cover 381 surrounds the batteries 330 and the barriers 320 together with the frame 310 to support and protect the batteries 330 and the barriers 320.

According to the battery assembly of the embodiments of the present invention described above, when barriers are mounted on a frame, protrusions of the barriers are coupled and guided by guide grooves of the frame so that the barriers can slidably move along a longitudinal direction of the frame. Thus, an operation of installing the barriers and the batteries on the frame may be easily performed.

In addition, while the protrusions are slidably supported, vertical movement of the protrusions is restricted, thereby limiting vertical movement of the barriers with respect to the frame, and thus the batteries may be stably supported by using a simple structure. Also, a uniform height of the batteries may be set, thereby facilitating a connecting operation of the batteries and maintaining a stable electrical connection between the batteries.

In addition, positioning of the barriers with respect to the frame may be precisely regulated by using an aligning unit or elastic protrusions, and thus, a mechanical and electrical connecting structure of the battery assembly may be further stabilized.

Also, air is easily circulated through apertures arranged in the frame and the barriers, thereby improving heat radiation performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery assembly, comprising:
a frame including a pair of side plates that face each other, each side plate having a guide groove that extends parallel to a bottom edge of the side plates, and a bottom plate connecting the bottom edges of the side plates;
a plurality of barriers, each barrier including a pair of side panels facing the side plates, a lower panel that connects lower ends of the side panels and faces the bottom plate, an upper panel connecting upper ends of the side panels, a plurality of protrusions protruding from the side panels and being coupled with the guide grooves, and a dividing panel that connects the side panels between the upper panel and the lower panel, wherein the protrusions are inserted into the guide grooves to allow barriers mounted to the frame to move only in a longitudinal direction of the frame; and
a plurality of batteries that are respectively accommodated within the barriers and the frame, wherein the barriers are stacked such that the dividing panels of the adjacent barriers face one another.

2. The battery assembly of claim 1, wherein the side plates comprise a first aperture through which the air flows in and out of the frame.

3. The battery assembly of claim 1, wherein the bottom plates comprise a second aperture through which the air flows in and out of the frame.

4. The battery assembly of claim 1, wherein the barriers further comprise a third aperture arranged in at least one of the side panel, the upper panel, and the lower panel to allow air to flow through the third aperture to the batteries.

5. The battery assembly of claim 1, further comprising an aligning unit arranged along inner edges of the frame where the side plates are connected to the bottom plate, the aligning unit being in contact with the barriers to regulate positioning of the barriers with respect to the frame.

6. The battery assembly of claim 5, wherein the aligning unit comprises a first surface contacting one of the side plates, a second surface contacting the bottom plate, and a third surface contacting the barriers.

7. The battery assembly of claim 6, wherein the aligning unit comprises an elastic material.

8. The battery assembly of claim 1, further comprising a plurality of elastic protrusions that protrudes from the bottom plate to support the lower panel of the barriers.

9. The battery assembly of claim 1, wherein each of the batteries comprises a pair of terminal portions that extends through grooves in the upper panel of the barriers.

10. The battery assembly of claim 1, further comprising a plurality of support protrusions that protrude from the dividing panel of each of the barriers to contact the batteries.

11. The battery assembly of claim 1, wherein the dividing panel is attached along a central longitudinal axis of each of the side plates so that each side plate of each barrier is arranged over two adjacent batteries.

12. The battery assembly of claim 10, wherein the batteries and the barriers are alternately stacked within the frame to produce a battery stack structure having adjoining batteries on both sides of each of the dividing panels of each barrier.

13. The battery assembly of claim 12, further comprising an external barrier that covers one of the batteries that is exposed at one of two end portions of the battery stack structure.

14. The battery assembly of claim 13, further comprising an external cover that is coupled to an outer portion of the frame to cover the external barrier.

15. The battery assembly of claim 14, further comprising an upper cover that is coupled to an upper portion of the frame to cover the upper panels of the barriers.

16. The battery assembly of claim 1, wherein each dividing panel is attached along a edge of each of the side plates so that each side plate of each barrier is arranged to correspond to only one of the batteries.

17. A battery assembly, comprising:
a frame including a pair of side plates that face each other, and a bottom plate connecting the bottom edges of the side plates, each of the side plates including a groove that extends along a length of the frame;
a plurality of barriers, each barrier including a pair of side panels facing the side plates, a lower panel that connects lower ends of the side panels and facing the bottom plate, an upper panel connecting upper ends of the side panels, and a dividing panel connected to each of the side panels, the lower and the upper panel, an external side of each side panel including a protrusion that engages with a corresponding groove of the frame; and
a plurality of batteries that are respectively accommodated within the frame in an alternating manner with the barriers, wherein the dividing panel of each barrier is arranged between two adjacent ones of the batteries.

18. The battery assembly of claim 17, wherein the protrusions and the grooves to allow the barriers together with the batteries to move only horizontally in a lengthwise direction of the frame.

19. The battery assembly of claim 17, further comprising an aligning unit arranged along bottom inner edges of the frame where the side plates are connected to the bottom plate, the aligning unit being in contact with the barriers to regulate positioning of the barriers with respect to the frame.

20. The battery assembly of claim 17, wherein each dividing panel has protrusions on both sides that contact ones of the batteries to provide a space between the barriers and the batteries to allow air to circulate.

* * * * *